W. A. UNDERHILL.
FIFTH WHEEL FOR WAGONS.
APPLICATION FILED JAN. 25, 1910.
975,004.
Patented Nov. 8, 1910.
2 SHEETS—SHEET 1.
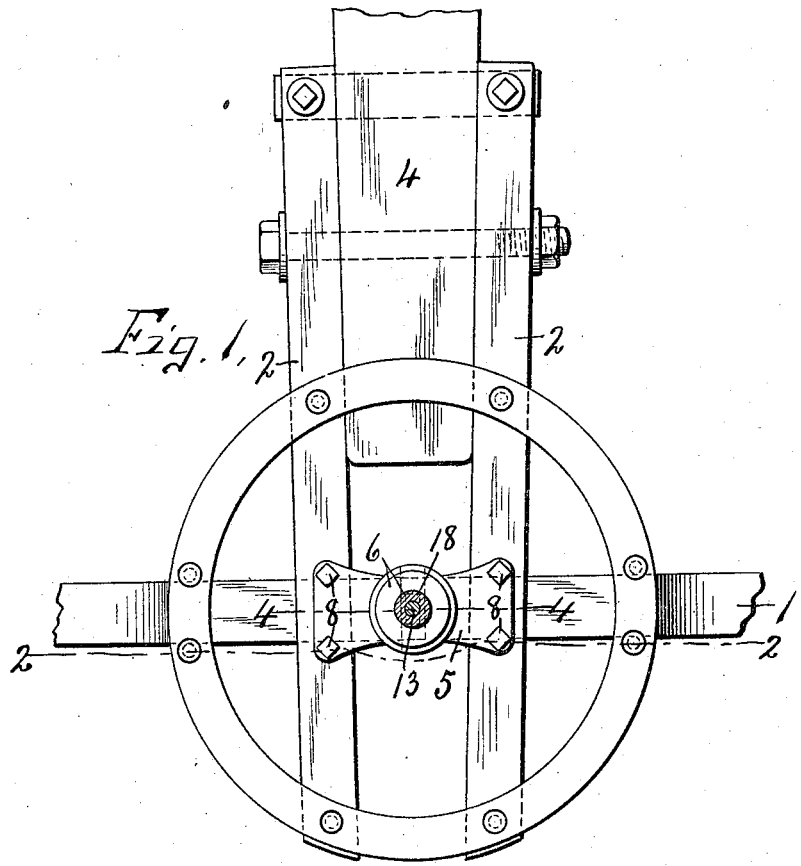
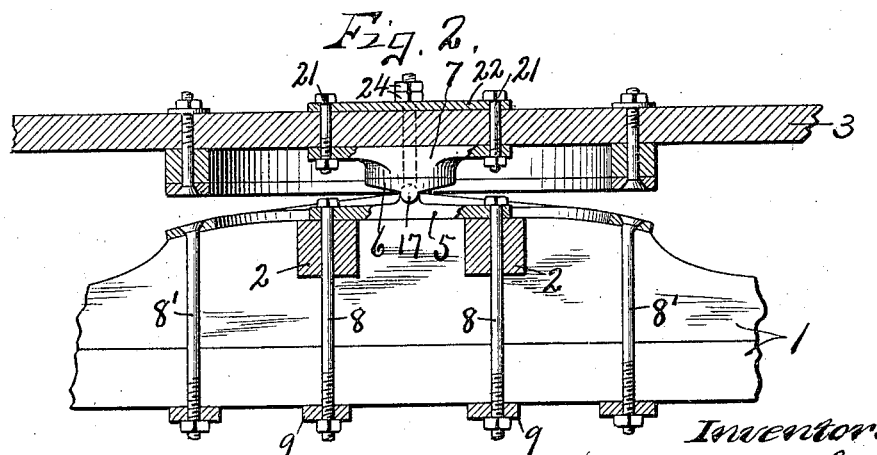

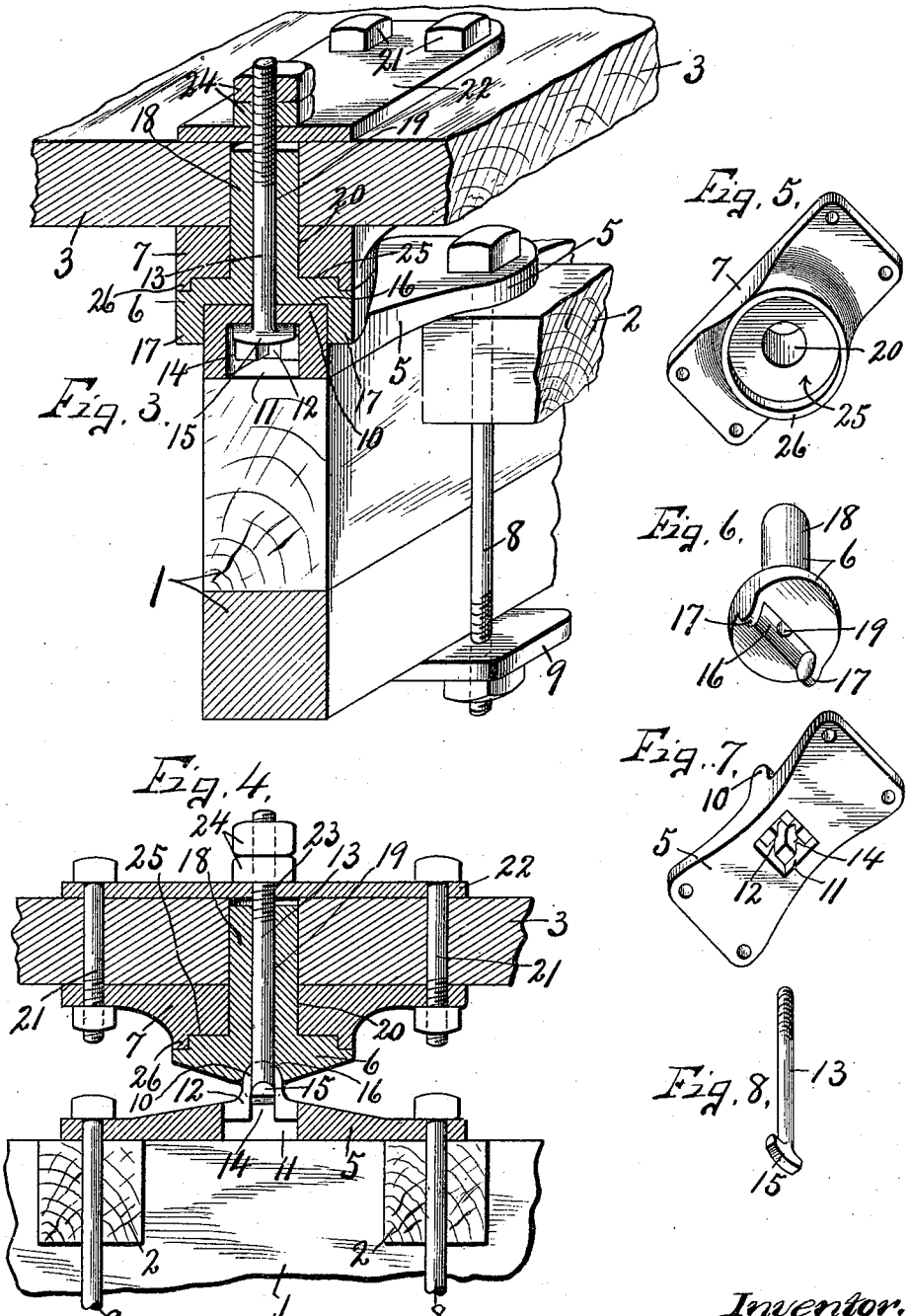

UNITED STATES PATENT OFFICE.

WALTER A. UNDERHILL, OF AUBURN, NEW YORK.

FIFTH-WHEEL FOR WAGONS.

975,004. Specification of Letters Patent. Patented Nov. 8, 1910.

Application filed January 25, 1910. Serial No. 539,951.

*To all whom it may concern:*

Be it known that I, WALTER A. UNDERHILL, of Auburn, in the county of Cayuga, in the State of New York, have invented new and useful Improvements in Fifth-Wheels for Wagons, of which the following, taken in connection with the accompanying drawings, is a full, clear, and exact description.

This invention relates to certain improvements in fifth wheels for wagons and is particularly adapted for dump wagons and similar vehicles which are adapted to carry heavy loads over dumps and more or less uneven surfaces. I am aware that it is common practice in this class of wagons to provide for the rocking movement of the front ends of the axle to relieve the box and connections between the box and axle from excessive torsional strains, but in all such devices with which I am familiar, the king bolt is either fastened to and adapted to rock with the axle by providing an elongated slot in connection with the box or else the king bolt is rigidly connected to the box and plays in an elongated slot in the axle; and in either of such instances the connection between the axle and box is more or less weakened. Furthermore where the king bolt is extended above and below the rocking axis of the axle, the backward and forward rocking movement of the front axle and box relatively to each other subjects the king bolt to severe shearing strains to such an extent as to frequently break such bolt somewhere in proximity to the plane of the meeting faces of the fifth wheel section or bearing faces.

The primary object of my present invention is to afford a free vertical rocking movement of the front axle at any angle in its horizontal sweep and at the same time to relieve the king bolt from excessive strains and thereby add greater strength and durability to the connection between the box and axle.

Other objects relating to specific parts of this connection will be brought out in the following description:

In the drawings—Figure 1 is a top plan of a portion of a front axle and hounds of a dump wagon showing the lower portions of the fifth wheel connection secured thereto, together with the central tubular head and king bolt which are shown in section. Fig. 2 is a sectional view taken on line 2—2, Fig. 1, showing the front portion of the box and adjacent portions of the fifth wheel section connected thereto. Fig. 3 is an enlarged perspective view partly in section of adjacent portions of the box and front axle and my improved fifth wheel connection in operative position. Fig. 4 is an enlarged sectional view taken on line 4—4, Fig. 1. Figs. 5, 6, 7 and 8 are perspective views respectively of the upper, intermediate and lower fifth wheel sections and king bolt.

In order to clearly illustrate the operation of my invention I have shown a portion of a front axle —1—, hounds —2— secured thereto, and the front portion of a box —3—, the hounds being connected in any well known manner to a suitable pole —4—. Interposed between the central portions of the axle —1— and box —3— are lower intermediate and upper fifth wheel sections —5—, —6— and —7—. The axle —1— is, in this instance, composed of a lower bar of steel and a corresponding bar of wood running lengthwise of and secured to the steel bar in the usual manner. The hounds —2— are also secured in the usual manner to the wood portion of the axle and extend forwardly and rearwardly therefrom with their upper faces in substantially the same plane as the upper face of the wood axle section.

The lower fifth wheel section —5— preferably consists of a substantially flat elongated cast metal plate resting upon and secured to the upper face of the wood section of the axle —1— and hound sections —2— by suitable clamping bolts —8— which are disposed at the front and rear sides of the axle and are passed through alined apertures in the hound sections —2— and laterally projecting ears of the lower fifth wheel section —5—, the lower ends of said clamping bolts being attached to suitable clip plates —9— which extend under the steel section of the axle —1—. These clamping bolts —8—, therefore, serve the purpose of securing the hound sections —2— and lower fifth wheel section —5— to the axle without perforating said axle and thereby weakening the same, and at the same time affording a broad bearing for the fifth wheel section. This lower fifth wheel section —5— is provided with a central transverse rib —10— of rounding cross-section rising some distance from the upper side of the main body and integral therewith, said rib being disposed at substantially right angles to the axle and having its upper face inclined downwardly from opposite sides of the rib to permit a free vertical rocking movement of the axle relatively to the superposed parts. The central portion of the plate —5— is recessed from the bottom upward at —11— and is provided with a slot —12— extending transversely through the central portion of the rib —10— and elongated in the direction of the length of the plate —5— for receiving one end of a king bolt —13—, said plate being also provided with a transverse groove or slot —14— extending upwardly into and lengthwise of the side of the rib —10— and communicating at its lower side with the recess —11—, thereby forming an open sided bearing for the head, as —15—, of the king bolt —13—. This groove or slot —14— is of substantially the same width lengthwise of the plate —5— as the diameter of the king bolt —13—, but is of less width than the transverse width of the rib —10— so as to leave ample stock on the rib at either side of the head of the king bolt. The slot —12— is also of substantially the same width as the diameter of the king bolt and is disposed at substantially right angles to the slot —14—. The head —15— of the king bolt —13— is elongated laterally equidistant at opposite sides of its axis in the direction of the length of the slot —14— in which it fits and bears against the upper side of said slot —14— when in operative position, so that the center of the head is substantially in the axis of the rib or bead —10— and thus permits the axle to rock vertically on such axis, as will be presently described.

The intermediate fifth wheel section —6— is preferably circular or cylindrical and is of somewhat greater diameter than the transverse width of the lower plate —5— and rib —10— upon which it is adapted to fit, the lower side of said section —6— being provided with a diametrically extending groove —16— of circular cross-section corresponding to that of the rib —10— with which it interfits. The portions of the intermediate section or head —6— at opposite ends of the groove —16— are formed with pendent lugs or ears —17— spaced apart a distance corresponding to the length of the rib —10— and are adapted to fit against the ends of the rib when the sections —5— and —6— are brought together with the rib —10— seated in the groove —16— so as to prevent sliding sidewise and forward and rearward movement of the parts —5— and —6— relatively to each other. This head or fifth wheel section —6— is provided with a central reduced tubular boss —18— and a central aperture —19— extending entirely therethrough from bottom to top, the said aperture being registered with the slot —12— in the plate —5— for receiving the king bolt —13—. The tubular boss —18— is passed through and fits with an easy rotary fit in a central opening —20— in the upper fifth wheel section —7— so as to hold these parts —6— and —7— against lateral sliding movement relatively to each other and at the same time permitting the head —6— to turn with the king bolt —13— and axle —1—.

It is now clear that the interfitting rib —10— and groove —16— afford a comparatively long bearing forwardly and rearwardly of the wagon and at the front and rear of the king bolt to resist forward and rearward rocking movement of the axle and box relatively to each other, and thus relieve the king bolt from shearing strains due to such action. The lower face of the head or fifth wheel section —6— at opposite sides of the groove —16— is beveled upwardly from the rib —10— so as to allow ample clearance for the vertical rocking movement of the axle relatively to the box.

The upper fifth wheel section —7— is also preferably made of cast metal and is secured to the under side of the box portion —3— by suitable fastening means, as bolts —21—, which are passed through alined apertures in the ends of the plate —7—, box section —3— and a superposed metal plate —22—, the latter simply taking the place of washers to prevent embedding of the heads or nuts of the bolts in the wood section —3— and is, in this instance, provided with a central bolt opening —23— for receiving the upper end of the king bolt —13—.

The vertical depth of the recess —11— is equal to or greater than the vertical depth of the head —15— of the king bolt which is normally held in operative position by suitable nuts —24— so that by loosening said nuts sufficiently to allow the head of the bolt to drop into the recess —11—, said bolt may be turned a quarter revolution to bring the oppositely projecting wings of the head —15— in registration with the slot —11—, whereupon the king bolt may be drawn upwardly out of engagement with the plate —5— thereby disconnecting the axle from the body or box of the wagon without displacing either of the fifth wheel sections from the parts to which they are secured, and at the same time keeping the king bolt in place ready for re-connecting the axis of the body when desired.

The tubular boss —18— of the intermediate fifth wheel section —6— preferably extends upwardly through an opening in the adjacent portion of the box —3— but terminates just below the washer plate —22—, the latter serving to cover the opening in the box —3— into which the tubular boss —18— projects.

The central portion of the upper fifth wheel section —7— projects downwardly some distance below the main body and is provided with a central socket having a flat upper face —25— which is engaged by a similar flat face on the head —6—, said socket being surrounded by an annular flange —26— which rides in an annular groove in the upper face of said head, thereby affording a broad bearing for said intermediate section —6— which is adapted to revolve with the axle.

It is now clear that by locating the head of the king bolt in the axis of the rib —10— and groove —16— constituting the rocking axis of the axle, said axle is free to rock vertically at any angle in its horizontal sweep without subjecting the king bolt to excessive shearing strains, and at the same time avoiding successive wear of the king bolt by the turn of the axle because such bolt turns with the head —6— which latter has broad bearing connections with the upper fifth wheel section —7—.

The operation of my invention will now be readily understood upon reference to the foregoing description and accompanying drawings.

What I claim is—

1. In combination with a box and front axle of a vehicle, a lower fifth wheel section secured to the axle and provided with a central transverse rib on its upper side and with an aperture extending from its lower side through the top of the rib, said rib having its upper face rounding in cross section, an upper fifth wheel section secured to the under side of the box and provided with a central opening therethrough, an intermediate fifth wheel section journaled in said opening and provided with a central bolt opening and a transverse groove in its lower side of rounding cross-section for receiving said rib, whereby the rib is free to rock transversely in the groove, and a king bolt passed through the opening in the lower and intermediate section and having a head bearing against the under side of the rib in the rocking axis thereof.

2. In combination with a front axle and body of a vehicle, a fifth wheel section resting on the top of the axle and provided with a transverse rib of rounding cross-section and a transverse groove extending into the rib and open at the bottom forming an open sided bearing substantially coincident with the axis of the rib, an upper fifth wheel section secured to the under side of the body, an intermediate fifth wheel section journaled in said upper section and provided with a central vertical bolt opening and a transverse groove of rounding cross-section in its lower side receiving said rib, and a king bolt secured in the bolt opening in the intermediate section and provided at its lower end with a head seated in said open sided bearing.

3. In combination with a front axle and body of a vehicle, a fifth wheel section secured to the upper face of the axle and provided with a central recess opening from its under side and a superposed transverse rib of rounding cross-section rising from its top face, said rib having a lengthwise groove in its under side communicating with a recess and also provided with a transverse slot communicating with the groove and recess, said groove forming an open sided bearing, an upper fifth wheel section secured to the under side of the body, an intermediate fifth wheel section journaled in the upper section and provided in its lower side with a transverse groove of rounding cross-section and a bolt opening leading upwardly from said groove and registered with the slot and groove in the lower section, and a king bolt having a head seated in said groove and secured in the central opening in the intermediate section.

In witness whereof I have hereunto set my hand this 5th day of January 1910.

WALTER A. UNDERHILL.

Witnesses:
F. C. WHITE,
HERBERT BRICE.